(12) United States Patent
Pair

(10) Patent No.: US 11,367,447 B2
(45) Date of Patent: Jun. 21, 2022

(54) SYSTEM AND METHOD FOR DIGITAL CONTENT DEVELOPMENT USING A NATURAL LANGUAGE INTERFACE

(71) Applicant: AT&T Intellectual Property I, L.P., Atlanta, GA (US)

(72) Inventor: Jackson Jarrell Pair, Los Angeles, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 95 days.

(21) Appl. No.: 16/896,748

(22) Filed: Jun. 9, 2020

(65) Prior Publication Data
US 2021/0383800 A1   Dec. 9, 2021

(51) Int. Cl.
*G10L 15/22*   (2006.01)
*G10L 15/30*   (2013.01)
*G10L 15/18*   (2013.01)

(52) U.S. Cl.
CPC .......... *G10L 15/22* (2013.01); *G10L 15/1815* (2013.01); *G10L 15/30* (2013.01); *G10L 2015/223* (2013.01)

(58) Field of Classification Search
USPC .................................................. 704/1–504
See application file for complete search history.

(56) References Cited

U.S. PATENT DOCUMENTS

| 8,762,852 | B2* | 6/2014 | Davis ...................... G06F 3/162 704/231 |
| 8,954,330 | B2* | 2/2015 | Koenig ................... G10L 21/10 704/270 |
| 9,128,702 | B2* | 9/2015 | Michael .................. G06F 9/544 |
| 9,292,895 | B2* | 3/2016 | Rodriguez ............. G11B 27/34 |
| 9,865,280 | B2* | 1/2018 | Sumner ................... G10L 25/48 |
| 10,043,516 | B2* | 8/2018 | Saddler ................... G10L 13/02 |
| 10,249,300 | B2* | 4/2019 | Booker ............... G06F 16/3344 |
| 10,445,429 | B2* | 10/2019 | Seyed Ibrahim ...... G06F 40/205 |
| 10,446,143 | B2* | 10/2019 | Akbacak ................ G10L 15/08 |
| 10,565,985 | B1* | 2/2020 | Huang .................... G06F 21/60 |
| 10,679,605 | B2* | 6/2020 | Gruber .................... G10L 13/00 |
| 10,705,794 | B2* | 7/2020 | Gruber .................... G10L 15/22 |
| 2010/0214286 | A1* | 8/2010 | Blumenthal ......... H04N 13/194 345/419 |
| 2011/0217685 | A1* | 9/2011 | Srinivasan ............... G09B 7/00 434/323 |
| 2012/0284012 | A1* | 11/2012 | Rodriguez ............. G06F 3/017 455/556.1 |
| 2013/0138424 | A1* | 5/2013 | Koenig ................... G10L 21/00 704/9 |

(Continued)

*Primary Examiner* — Marcus T Riley
(74) *Attorney, Agent, or Firm* — Guntin & Gust, PLC; Ralph Trementozzi

(57) ABSTRACT

Aspects of the subject disclosure may include, for example, obtaining a natural language instruction, interpreting the instruction to obtain a machine interpretation, and analyzing the machine interpretation to obtain an intent of the natural language instruction. An actionable command adapted to cause a digital manipulation tool to digitally manipulate a content item is determined according to the intent of the natural language instruction. The actionable command is provided to the digital manipulation tool to obtain the manipulated content item. Other embodiments are disclosed.

20 Claims, 8 Drawing Sheets

(56) References Cited

U.S. PATENT DOCUMENTS

| | | | |
|---|---|---|---|
| 2013/0275899 A1* | 10/2013 | Schubert | B60K 35/00 715/765 |
| 2015/0193286 A1* | 7/2015 | Michael | G06F 8/31 717/139 |
| 2016/0260433 A1* | 9/2016 | Sumner | G06F 40/30 |
| 2017/0278179 A1* | 9/2017 | Perrier | G06Q 30/0621 |
| 2018/0329957 A1* | 11/2018 | Frazzingaro | G06F 40/30 |
| 2019/0180742 A1* | 6/2019 | Kothari | G10L 15/1822 |
| 2019/0180770 A1* | 6/2019 | Kothari | G06F 3/167 |
| 2019/0228269 A1* | 7/2019 | Brent | G09B 19/0069 |
| 2019/0244435 A1* | 8/2019 | Grenfell | G06T 19/20 |
| 2019/0299108 A1* | 10/2019 | Andall | A63F 13/85 |
| 2019/0355359 A1* | 11/2019 | Bhaya | H04L 65/601 |
| 2019/0377460 A1* | 12/2019 | Butcher | G06N 3/088 |
| 2020/0312317 A1* | 10/2020 | Kothari | G06F 9/5027 |
| 2020/0388280 A1* | 12/2020 | Muppalla | G06F 11/0769 |
| 2021/0383800 A1* | 12/2021 | Pair | G06F 3/167 |

* cited by examiner

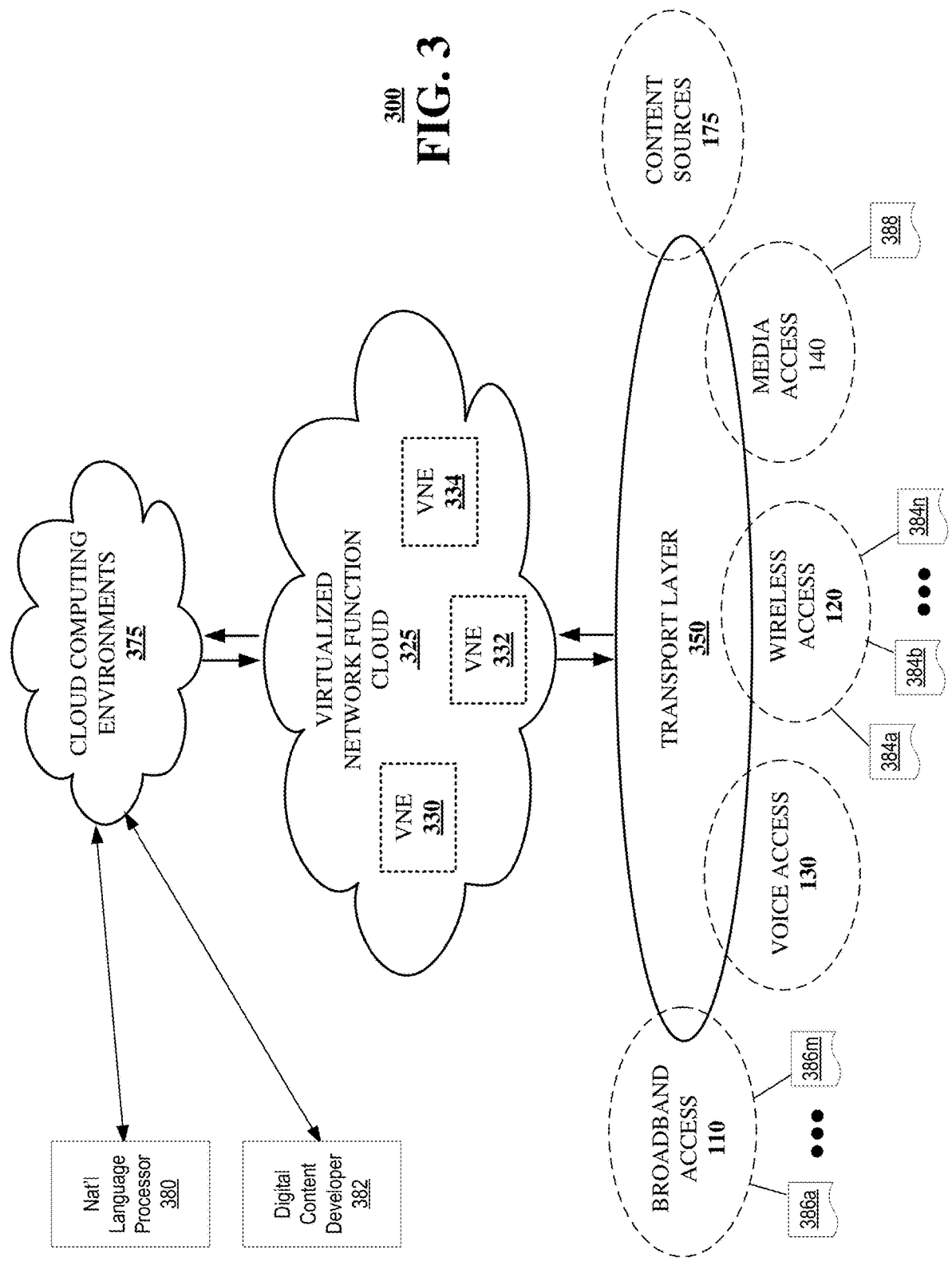

SYSTEM AND METHOD FOR DIGITAL CONTENT DEVELOPMENT USING A NATURAL LANGUAGE INTERFACE

FIELD OF THE DISCLOSURE

The subject disclosure relates to a system and method for digital content development using a natural language interface.

BACKGROUND

Digitally generated content is commonly utilized in media-based applications. Examples include animation, special effects, interactive video games, advertising, augmented reality (AR), virtual reality (VR), scientific visualization, and graphic design. With respect to visual applications, digitally generated content may include one or more of two-dimensional (2D) content, three-dimensional (3D) content and animated graphics.

Some digitally generated content may be developed according to digital images of real, or physical objects, e.g., using images obtained via digital photography and/or digital videography. Other digitally generated content may be developed without restrictions of physical objects or environments. For example, imagery used in some video games, animation or even cinema may include realistic landscapes, objects, and actors. Alternatively or in addition, imagery may include imaginative subject matter, limited only by the imagination of a content creator. The subject matter of digitally generated content may include landscapes, such as land, sea, sky vegetation, inanimate objects, such as buildings or vehicles and animals, including humanoids, real or imagined.

Digital content synthesis and/or manipulation may be accomplished via one or more supporting software tools. Such tools may take the form of application programs and/or services. Such tools may facilitate content generation by one or more of user definition, user selection among previously generated content elements, and application of computer algorithms.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
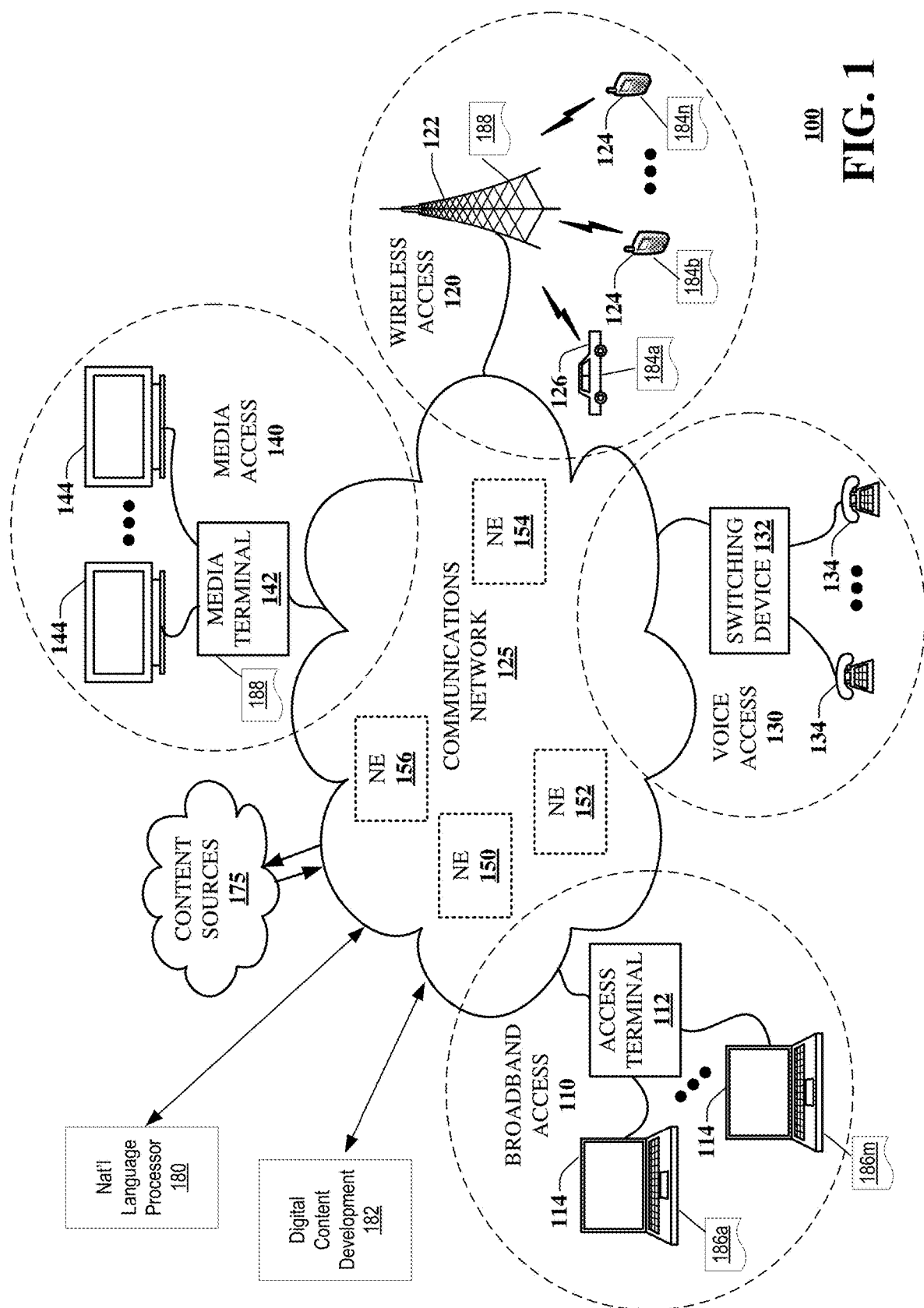
FIG. 1 is a block diagram illustrating an exemplary, non-limiting embodiment of a communications network in accordance with various aspects described herein.

Unfortunately, digital content synthesis and/or manipulation, including utilization of supporting tools, typically requires specialized training and/or skills. The subject disclosure describes, among other things, illustrative embodiments for obtaining a natural language instruction, analyzing it to obtain user intention, and formulating an actionable command according to the intention. The actionable command is adapted to cause a digital manipulation tool to digitally manipulate a content item according to the natural language instruction. Beneficially, the digital manipulation tool is operable according to the natural language instruction, without requiring user training and/or familiarity with operation of the digital manipulation tool. Other embodiments are described in the subject disclosure.

One or more aspects of the subject disclosure include a process that includes receiving, by a processing system including a processor, a natural language instruction and generating a machine interpretation of the natural language instruction. The machine interpretation of the spoken, natural language instruction is analyzed, by the processing system, to obtain an intent of the spoken, natural language instruction. A first actionable command is identified, by the processing system, wherein the command is adapted to cause a first digital manipulation tool to digitally manipulate a content item according to the intent of the spoken, natural language instruction, to obtain a manipulated content item. The first actionable command is provided, by the processing system, to the first digital manipulation tool to obtain the manipulated content item.

One or more aspects of the subject disclosure include a device, including a processing system having a processor and a memory that stores executable instructions. The instructions, when executed by the processing system, facilitate performance of operations that include obtaining an input signal including a natural language instruction. The input signal is interpreted to obtain a machine interpretation of the natural language instruction. The machine interpretation of the natural language instruction is analyzed to obtain an intent of the natural language instruction. An actionable command adapted to cause a digital manipulation tool to digitally manipulate a content item is determined according to the intent of the natural language instruction, to obtain a manipulated content item. The actionable command is sent to the digital manipulation tool to obtain the manipulated content item.

One or more aspects of the subject disclosure include a non-transitory, machine-readable medium, including executable instructions that, when executed by a processing system including a processor, facilitate performance of operations. The operations include obtaining a natural language instruction and interpreting the natural language instruction to obtain a machine interpretation of the natural language instruction. The machine interpretation of the natural language instruction is analyzed to obtain an intent of the natural language instruction. An actionable command adapted to cause a digital manipulation tool to digitally manipulate a content item is determined according to the intent of the natural language instruction, to obtain a manipulated content item. The actionable command is provided to the digital manipulation tool to obtain the manipulated content item.

Currently, the process of creating 2D and 3D interactive and non-interactive or passive content requires the use of content development tools that are manipulated or otherwise controlled via a mouse, a keyboard, a pen, and/or touch interfaces, e.g., utilizing drag and drop features. Using tools for these types of content creation generally requires familiarity with specialized commands, user interfaces and workflows, as well as proficiency in manipulating the interfaces. Such steep learning curves can pose a significant barrier to entry to digital artistry and/or animation. Even after a user has obtained a required degree of proficiency, the content creation process using these tools can be extremely time consuming.

The demand for new 2D and 3D content is rising exponentially as distribution accelerates with increasing wireless and wired internet speeds, widening internet access availability, and the further proliferation of wired and wireless devices for experiencing both interactive and passive content. This tool accelerates the content creation process while also expanding its accessibility beyond content creation experts and specialists. As a result, the various aspects disclosed herein serve to fulfill the increasing demand for 2D and 3D content that cannot be met by current toolchains and workflows. It is an object of the techniques disclosed herein to reduce the learning curve as well as time required for creating 2D and 3D audio visual content.

In some embodiments, voice and/or text based natural language processing are adapted to provide a primary user interface that may be coupled with a procedural based content development systems. These systems may facilitate creation of new content and/or entity retrieval of preexisting content from content sources, such as content resource libraries and/or databases. A voice interface is provided as a primary means of interacting with one or more content development tools. The interface and the tool(s) can be applied to a wide variety of digital content types and mediums including but not limited to games, movies, television, internet video, internet content, virtual reality, augmented reality, mixed reality, and advertising content.

Referring now to FIG. 1, a block diagram is shown illustrating an example, non-limiting embodiment of a system 100 in accordance with various aspects described herein. For example, the system 100 can facilitate in whole or in part obtaining a natural language instruction and interpreting it to obtain a machine interpretation that is analyzed to obtain an intention of the natural language instruction. An actionable command is determined according to the intention. The actionable command is adapted to cause a digital manipulation tool to digitally manipulate a content item to obtain a manipulated content item according to the natural language instruction. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text, and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway, or other media terminal 142. The display devices 144 can include televisions with or without a set top box, personal computers, and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In some embodiments, such as the example system 100, a natural language processor 180 is in communication with one or more mobile devices 124, 126 and/or static devices, e.g., 114, and/or media terminals 142. The natural language processor 180 may be adapted to facilitate in whole or in part interpretation of a natural language input to determine an intention regarding development of digital content according to the various techniques disclosed herein. In at least some embodiments, the natural language processor 180 generates an actionable command to develop digital content according to the intention of the natural language command. Likewise, in at least some embodiments, such as the example system 100, a digital content development tool, illustrated as a content development server 182, is in communication with one or more mobile devices 124, 126 and/or static devices, e.g., 114, and/or media terminals 142, and/or other components of the communication network 125, e.g., one or more of the network elements 150, 152, 154, 156. In at least some embodiments, the content development processor 180 may be adapted to facilitate in whole or in part development of digital content according to the actionable commands.

In at least some embodiments, the mobile devices 124, 126 may include resident functionality 184a, 184b, ... 184n, generally 184, e.g., in the form of any one of an operating system, a client, a resident app, and combinations thereof. The resident functionality may be adapted to perform one or more of the techniques disclosed herein, such as interpretation of the natural language input to determine intention, generation of an actionable command to develop digital content according to the intention, and/or development of digital content according to the actionable commands, as discussed further below. In at least some embodiments, the resident functionality 184 operations in cooperation with external functionality, e.g., functionality of other mobile devices and/or services and/or systems. For example, the resident functionality provides client functionality of a client-server arrangement, in which server functionality is provided by another device, such as the natural language processor 180 and/or the content development server 182.

Likewise, the stationary devices 114 can be adapted with functionality 186a ... 186m, generally 186, and the media terminal 142 adapted with functionality 188, in the form of any one of an operating system, a client, a resident app, and combinations thereof. The resident functionalities 186, 188 can be adapted to perform one or more of the techniques disclosed herein, such as interpretation of the natural language input to determine intention, generation of an actionable command to develop digital content according to the intention, and/or development of digital content according to the actionable commands. In at least some embodiments, one or more of the functionalities 186, 188 operate in cooperation with external functionality, e.g., functionality of other devices and/or services and/or systems. For example, the functionality 186 and/or 188 may provide client functionality of a client-server arrangement, in which server functionality is provided by another device, such as the natural language processor 180 and/or the content development server 182. In some embodiments, the stationary devices 114 and/or the media terminal 142 may include network enabled devices, such as smart appliances, and the like implementing machine-type communications. It is envisioned that one or more stationary devices 114 and/or the media terminal 142 may be adapted to facilitate one or more of the interpretation of the natural language input to determine intention, the generation of the one or more actionable commands to develop digital content according to the intention, and/or the development of the digital content according to the actionable commands. In some embodiments, functionalities of one or more of the natural language processor 180 and/or the content development processor 182 may be implemented in whole or in part on one or more of the mobile devices 124, 126, on one or more of the stationary devices 114 and/or one or more of the media terminals 142. Accordingly, it is envisioned that in at least some embodiments, one or more of the natural language processor 180 and/or the content development processor 182 may not be required, as their respective functionalities may be implemented on other elements of the system 100, such as the network elements 150, 152, 154, 156, the mobile terminals 124, 126, the stationary devices 114 and/or the media terminals 142.

Figure 2A:
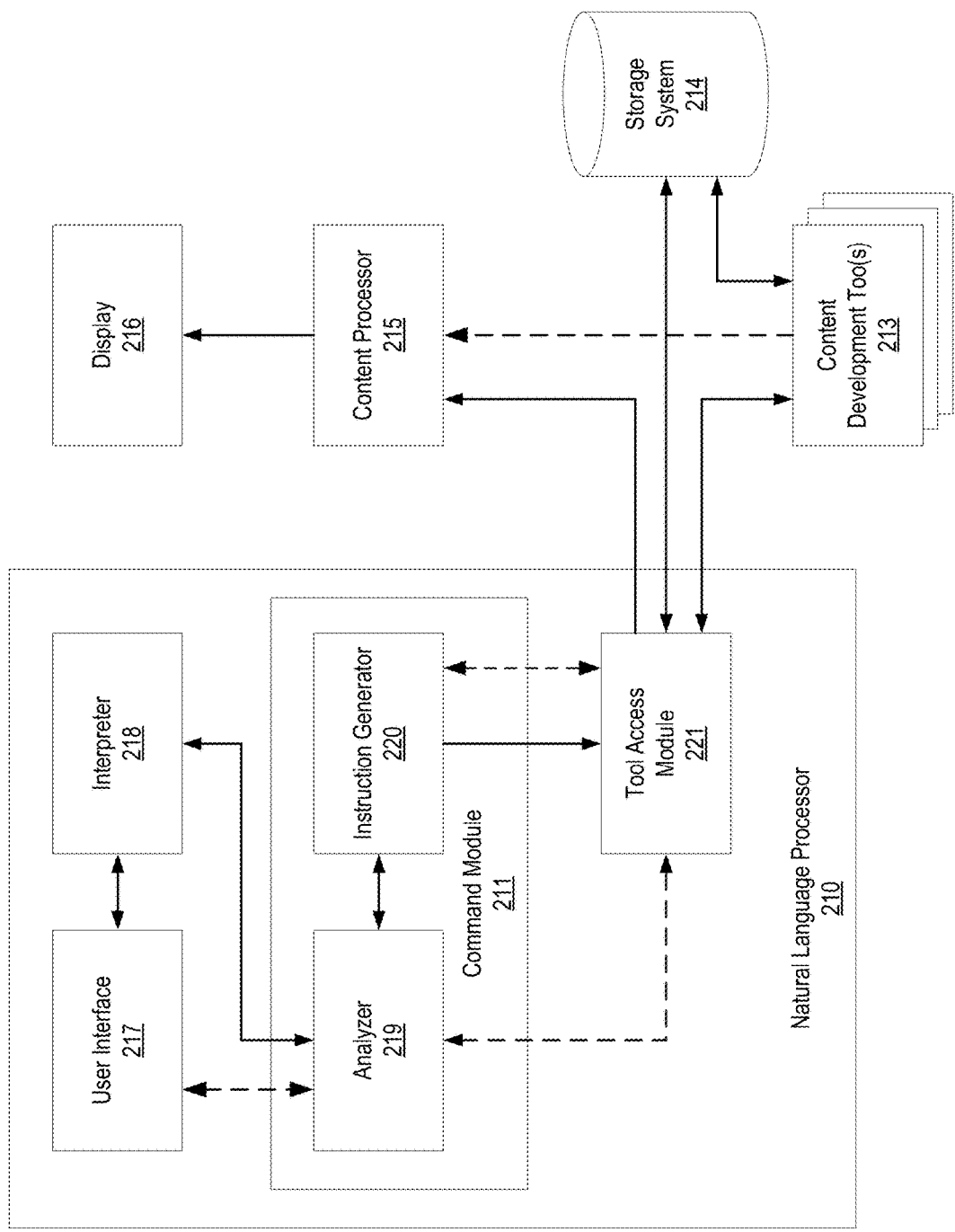
FIG. 2A is a block diagram illustrating an example, non-limiting embodiment of a digital content development system functioning within the communication network of FIG. 1 in accordance with various aspects described herein.

FIG. 2A is a block diagram illustrating an example, non-limiting embodiment of a digital content development system 200 functioning within the communication network 100 of FIG. 1, in accordance with various aspects described herein. The system 200 may include a natural language processor 210, adapted to process natural language input. The natural language input may include words spoken by a human, e.g., verbal utterances. In at least some embodiments, natural language input may include paralinguistic features, such as facial expressions, laughter, eye contact, and gestures. For example, the natural language input may include non-verbal utterances, such as a sigh and/or laughter. Other non-verbal utterances may include, without limitation, "ugh," "tsk," "huh?", "um," and more generally, any utterances as may be used in conversational non-verbal behaviors. It is understood that determining meaning and/or intention from natural language input may depend at least in part on generally accepted definitions of words and terms. It is also understood that in at least some instances, meaning may be determined from paralinguistic features, such as non-verbal utterances or gestures, either alone or on combination with verbal utterances. In some instances, paralinguistic features, such as non-verbal utterances and/or gestures may contribute to any sentiment as may be used determining meaning. In at least some instances, meaning may be inferred based on context, e.g., prior input, a current project, information obtained from a user profile, such as age, gender, occupation, preferences.

In at least some embodiments, natural language input, e.g., including utterances, verbal or otherwise, may be converted to a signal, e.g., using a transducer, such as a microphone. Non-audible paralinguistic features, such as gestures, may be obtained from other input devices, such as a camera or camera array and/or a touch screen or touchpad. The signal may include an analog signal component and/or a digital signal component. The signal may include an electrical signal, such as a time-varying voltage and/or current, representative of the input. Digital signals may be obtained using analog-to-digital converters adapted to convert an analog signal into a digital representation. In at least some embodiments, the signals may be obtained from paralinguistic features, such images and/or video clips of a user providing input to the system 200. Alternatively or in addition, the input signals may include alphanumeric values, e.g., determined according to gestures entered at a touch-sensitive device, menu inputs and the like. It is conceivable that natural language input may be obtained directly from utterances of a human, and/or via audio, video, or audiovisual recordings. It is also conceivable that natural language input may be obtained from synthesized words, e.g., words uttered by a machine.

It is understood that natural language input includes words spoken by a human, paralinguistic cues, recordings of words and/or paralinguistic cues and synthesized words or speech. It is understood further that natural language input may include input obtained from a user input device, such as a keyboard, keypad, pointing device, such as a mouse or stylus. Such natural language input may include text, e.g., entered by the keyboard, and/or machine-readable symbols obtained via the input device, e.g., as may be generated responsive to a user selection of a menu item.

The natural language processor 210 may be adapted to determine an intention from the input and to generate one or more instructions and/or actionable commands responsive to the intention. The natural language processor 210 may be in communication with one or more content development tools 213. The content development tool(s) 213 may be adapted to develop digital content, e.g., by one or more of creation, modification, manipulation, combination, transformation, animation, actuation for interactive play, integration with other digital content, presentation, and the like. The actionable command(s), when provided by the natural language processor 210 to the development tool(s) 213, cause the tool(s) to implement one or more actions according to the determined intention. Implementation of the commands cause the tool(s) 213 to create, modify, combine, transform, animate, actuate, integrate, and/or otherwise manipulate digital content to fulfill the perceived intention of the user input.

The example system 200 may include a storage device or storage system 214 in communication with one or more of the natural language processor 210 and the content development tool 213. The storage system 214 may, alone and/or together with the content development tool 213, provide a searchable repository of content items and may be integrated with the system 200 and/or at least remotely accessible to the natural language processor 210, e.g., via network connectivity. The storage system 214 may be adapted to store, organize, catalogue and/or retrieve one or more digital content items. By way of example, the content development tool(s) 213 may include a selection tool adapted to select digital content items from the storage system 214. Alternatively or in addition, the content development tool(s) 213 may include a content generation tool adapted to generate and/or otherwise create digital content items that may be stored in the storage system 214 for archiving and/or later retrieval. Content items may include, without limitation, complete scenes, elements of scenes, such as landscape items, e.g., hills, mountains, lakes, clouds, objects within a scene, such as buildings, vehicles, trees, and/or actors, such as animals, including people.

One or more of the natural language processor 210 and the content development tool 213 may be in further communication with a content processor 215. The content processor 215 may be adapted to process digital content, such as digital content items enacted upon by the content development tool(s) 213, digital work products that incorporate one or more of the digital content items enacted upon by the tool(s) 213, such as video content, audio content, audio visual content, passive content, interactive content, such as computer games, and the like. Such processing may include preparation for presentation on a display device 216.

In some embodiments, the content processor provides a workspace or work environment adapted to present digital content items that may be in development and/or developed according to the natural language processor 210 and/or the one or more content development tools 213. Processing of the digital content items may include, without limitation, assembly of one or more digital content items into a composite scene, rendering of one or more of the digital content items and/or at least a portion of the composite scene, animation of one or more elements of the scene and/or characters within the scene. Other elements of a scene, such as lighting, camera angles, viewing perspectives, and the like may be implemented by one or more of the content development tool(s) 213, the natural language processor 210 and/or the content processor 215. The processed output provided by the content processor 215 may include a rendered frame or group of frames, e.g., according to an animation. Alternatively or in addition, processed output may include one or more scenes and/or actors suitable for incorporation into gameplay of a computer game.

According to the techniques disclosed herein, natural language input, such as spoken instructions, may be used to create video. Natural language input may indicate "create a video scene," e.g., followed by subsequent instruction to further development of a video scene. Such instructions may identify a location of a scene, e.g., a city, a natural scene, such as a meadow or a mountain, outer space, under water and so on. For example, a user may speak "create object X in background Y." Such an instruction is an example of a compound instruction that may result in generation of a first group of actionable commands adapted to create a background Y according to a first digital content development tool. Likewise, the same compound instruction may result in generation of a second group of actionable commands adapted to create the object X according to the first digital development tool, or perhaps a different digital content development tool. It is conceivable that such a compound instruction may result in yet a third group of actionable commands adapted to position the object X, once created, into the scene Y, to obtain an approximation of the user's original request.

It is understood that in at least some embodiments, the system 200 may include logic and/or rules adapted to process compound instructions, and/or to parse out and/or to otherwise determine sub-instructions, e.g., to generate X, and to generate Y, and to combine X and Y, once generated. Such logic and/or rules may be adapted to determine an ordering and/or sequencing in which the sub-instructions should be implemented. For example, the logic and/or rules may identify one or more dependencies, such that a first sub-instruction that depends upon a result of a second sub-instruction is applied only after a response to the second sub-instruction is obtained.

Alternatively or in addition, such instructions may identify a style and/or format of the scene, objects or actors within a scene, and/or animation as may be applied to the scene and/or objects or actors within a scene. Example styles may include 2D animation, 3D animation, realistic, cartoonish, and so on. The particular digital development tool selected and/or actionable commands determined in response to the input may depend upon identified styles, genres, samples, e.g., "generate a scene like 'Star Wars'," or generate a scene similar to the "Simpsons." According to the first example, tools and/or actionable commands are adapted to provide realistic scenes, objects, characters and/or actions, while in the latter, they may be adapted to provide cartoonish scenes, characters, and/or actions, e.g., according to coloring, level of detail and so on.

In at least some embodiments, one or more instructions may be inferred from the natural language input, e.g., the spoken instruction. For example, the natural language input may indicate "create a Western-style scene," or "create an alien-world scene." Inference may be drawn that a Western-style scene may include a particular landscapes, such as a desert, a mountain range, one or two-story wooden buildings, characters, such as cowboys, styles of clothing, objects, such as horses and cactus and the like. Thus, from the command "create a Western-style scene" inferences can be drawn as to particular features and/or objects and/or characters of the scene. In response to such inferences, an original intention to create the scene can be mapped to a more detailed group of inferred intentions to create one or more of the features and/or objects and/or characters that may make up the intended scene. Actionable commands may then be generated according to the more detailed group of inferred intentions.

It is understood that in at least some applications, different tools may be used for different aspects of the originally intended scene. Continuing with the Western-style scene example, a first group of interred intentions to create a landscape and/or backdrop may use an algorithm-based tool to generate a sandscape, mountains and/or dessert sky features. Likewise, a second group of inferred intentions to create a character in the scene may use a selection tool adapted to select a character from a stock of characters stored in a library and/or database resource. To the extent one or more of the natural language intention and/or inferred intentions neglect to identify parameters as may be required to comply with the instruction, estimates may be made. For example, estimates may be made regarding features, such as lighting, camera position for video, scale, angle, graphic interaction rules, e.g., how physics may be modeled in animations, color palate, image filtering, and so on. Alternatively or in addition, the system 200 may be adapted to request user clarification, e.g., via supplemental user input, before completing a response to the natural language input, such that tool selection and/or the particular actionable commands may be adapted to comply with clarification obtained by supplemental user input. Alternatively or in addition, the system 200 may be adapted to request a user response, e.g., via supplemental user input, after completing a response to at least a portion of the natural language input, e.g., the first group of interred actions. The supplemental input may indicate acceptance or rejection of a result obtained according to system selections, estimations and/or guesses applied to one or more parameters. In response to a rejection, the system may prompt the user to provide supplemental user input to provide further detail, clarification, and/or correction. Any supplemental content may be processed, resulting in one or more of a tool selection and/or the particular actionable commands may be adapted to comply with clarification obtained by supplemental user input.

In at least some embodiments, the content processor 215 may be used to provide feedback to a user, such as visual representations of implementations of intentions obtained responsive to the natural language input. Such feedback may occur periodically, e.g., responsive to completion of a task, a project, and/or upon a request by the user. Alternatively or in addition, such feedback may occur in real time, or near-real time. In this manner, a user may observe results of an implementation of determined intention. Such presented results may represent valuable feedback to confirm an implementation and/or to correct and/or further adjust a digital content work product as may be necessary. It is understood that in at least some embodiments, the natural language processor 210 may provide to the content processor 215 output for presentation on the display other than the digital content work product. For example, the output may include an indication of the user input, e.g., text obtained from a speech-to-text processing of a verbal input to allow a user to confirm accuracy of a verbal command. Alternatively or in addition, the output may include an indication of the determined intent and/or the actionable commands.

Actional command(s) generated natural language processor 210 may be adapted to develop digital content in cooperation with one or more digital content development tools. For example, the natural language processor 210 may generate any actionable command(s) responsive to a determined intention of a natural language user input, wherein the actionable commands are adapted for a particular digital content development tool. In at least some embodiments, the natural language processor 210, in response to the same intention, may generate different actionable command(s) depending upon a particular digital development tool towards which the actionable command(s) are directed.

In at least some embodiments, feedback provided by the content processor 215 and/or the display device 216 may be used as a training tool. Feedback may include one or more of a natural language input, a determined intent and/or actionable commands. Such a training tool may be adapted to familiarize a user with operation of the one or more digital development tools 213, by exposition of the actionable commands alone or in combination with one or more of the determined intent and the natural language input. Alternatively or in addition, such a training tool may facilitate improvement to natural language inputs by associating one or more of a content development tool response, and/or a determined intent with a natural language input. A user may observe which natural language inputs produced desirable and/or undesirable results, which may lead to modified natural language inputs in order to better achieve operation of the system 200.

It is understood that the natural language processor 210 may include machine learning. Machine learning may be applied to one or more of user input, including natural language input, determination of intentions from the user input and/or generation of actionable commands responsive to the intentions and/or user input. Machine learning may be applied generally to input received from multiple users and/or restricted to a single user or group of users, e.g., to personalize performance of the system 200. Alternatively or in addition, machine learning may be applied to one or more categories of users and/or content development tool(s) 213, e.g., to improve performance of the system by one or more of accuracy or efficiency. In at least some embodiments, machine learning may be applied to particular tasks as may be related to the digital content development process.

Machine learning may use a training set associated with a particular user, or a group of users. For example, the machine learning may use a training set obtained from interactions with other users. The other users may be related to the particular user and/or other users that may not be related, but share similar characteristics, interests, and/or browsing histories. For example, machine learning may be applied to individuals of a particular creative company, such as individuals of a particular studio, or a particular animation studio, and/or a particular game developer. Alternatively or in addition, machine learning may be applied to classes of users, such as, cartoonists, animators, game developers.

The natural language processor 210 may include one or more of a user interface 217, an interpreter module 218, a command module 211 and in at least some embodiments, a tool access module 221. The user interface 217 may be adapted to accept or otherwise receive input from a user. The user input may include one or more of audio input, e.g., user vocalizations and/or visual input, such as still images and/or video. For example, the user interface 217 may include a microphone, a microphone array, and/or a camera system including a digital camera and/or a digital camera array. The microphone may be adapted to record user sounds, including verbal and non-verbal utterances of the user. In at least some embodiments, the microphone may be adapted to capture ambient sounds. The camera system may be adapted to capture one or more of a user's physical gestures, body position, expression, such as facial expression, body language, ambient conditions, such as lighting, sound levels, detection of other individuals, and so on.

Alternatively or in addition, the user interface 217 may be adapted to receive one or more of textual input and/or user selections responsive to user prompts. For example, the user interface 217 may include one or more of a keyboard or keypad, a touchpad, a touch screen, a pointing device, such as a mouse, a joystick, a trackball, and the like. Textual input may be obtained via user entry of typewritten commands at a keyboard and/or keypad and/or selection of a prompt, such as an image, a word or collection of words, a phrase, and so on, e.g., upon a graphical interface of the user interface 217. Still other forms of user input may include gesture-based input, e.g., according to user manipulation of a touchpad of the user interface 217 and/or according to a camera system adapted to observe a position and/or motion of at least a portion of a user's body, such as a position of a finger or hand, or a movement of a finger or fingers, a hand or hands, forearm, wrist, head, torso, legs, objects manipulated by a user, such as a stylus, a baton, a ball, an article of clothing, such as a shirt, a jacket, a hat, a glove, and the like.

It is understood that in at least some embodiments, user input may include multimodal input, such as combinations of one or more of audio input, e.g., speech, visual input, e.g., user position and/or movements, textual input and/or input from one or more pointing devices. The natural language processing may be applied to one or more of the various modes of input, such as vocalizations alone, vocalizations in combination with one or more of visual cues obtained from the user and/or an environment of the user, textual input and/or input obtained from a pointing device.

The interpreter module 218 may be adapted to process input obtained from the user interface 217 according to one or more of the various modes of user input. In some embodiments, the interpreter module 218 may include a translator adapted to generate machine-readable input from one or more of the various modes of user input. For example, the interpreter module 218 may include a speech-to-text processor adapted to generate text representative of a vocal input obtained via a microphone system. Alternatively or in addition, the interpreter module 218 may include an audio processor adapted to interpret at least some aspects of a user's vocalizations, converting them into a machine-readable form. For example, certain spoken words, phrases, sentences received via the microphone system result in electrical signals having characteristics, such as amplitude response, frequency response, intensity, and so on. It is understood that in at least some instances one or more characteristics of the electrical signals may be recognizable as a word, phrase, or sentence. For example, such electrical signals or parts of signals may be compared and/or otherwise correlated to a reference, such as a library of signals, to determine candidate matches. It is conceivable that the interpreter module 218 may arrive at an interpretation of a user input, or at least a portion of the user input, according to analysis of an electrical signal obtained from a vocal input without using a speech-to-text processor.

Interpretations of a user input may be provided to the command module 211 for further processing. The command module 211 may include an analyzer module 219 and an instruction generator 220. The command module 211 may receive interpretations from the interpreter 218 and analyze the interpreted input alone or in combination with the interpreter 218 to determine one or more intentions associated with the user input. Analysis performed by the analyzer module 219 may include, without limitation, application of one or more of a parser, a dictionary and/or grammar. It is understood that the extent of intentions may be limited by one or more of a general application of digital content development, a particular application of digital content development, such as animation, and/or one or more of the content development tool(s) 213.

Consider a dictionary and/or grammar defined, at least in part, by predetermined processes associated with digital content development. For example, common instructions may include a bounded group of words or phrases generally related to the digital development process, such as insert, move, delete, resize, copy, paste, rotate, animate, illuminate, texturize, and so on. Alternatively or in addition, instructions may be determined according to predefined instructions and/or application programming interfaces (API) of a particular tool or group of tools. In addition to interpreting individual words or phrases, instructions may adhere to a predetermined grammar, e.g., including an action to be implemented by one of the content development tools 213 and an object to be enacted upon by the tool(s).

The interpreter module 218 and/or the analyzer module 219 may include associations of variations in expression of user input, with predetermined intentions and/or commands, e.g., to allow the interpreter module 218 and/or the analyzer module 219 to synthesize a relatively free-form, or natural language input, into a predetermined command. It is understood that such associations may be predetermined, e.g., pre-loaded into the interpreter and/or analyzer module 219. Alternatively or in addition, such associations may be identified, modified, and/or refined based on user input. For example, the interpreter module 218 and/or the analyzer module 219 may apply machine learning, e.g., identifying associations of natural language input with determined intentions that required corrections and/or those that did not require corrections. Modifications may be made to the associations as appropriate based on identifications of correct and/or incorrect prior determined intentions.

Adaptation of the command(s) may include formulating commands that utilize a finite set of predetermined commands, the commands corresponding to a particular tool towards which the commands are directed. It is understood that an intention determined from the natural language user input, e.g., texturize an object, may lead to a first actionable command, when directed towards a first digital development tool configured to texturize an object, while leading to a second, different actionable command, when directed towards a second digital development tool also configured to texturize an object.

In at least some embodiments, the analyzer module 219 may receive at least a portion of user input directly from the user interface 217. For example, verbal and/or visual cues may be forwarded to the interpreter module 218, while one or more non-verbal and/or non-visual cues, such as text, menu selections and the like are provided directly to the analyzer module 219. It is understood that in at least some embodiments, one or more of the interpreter module 218 and/or the analyzer module 219 may provide input to the user interface 217. By way of example, and without limitation, such input may take a form of a prompt direct towards the user, a menu of selectable options, a query based on received user input, and so on. Such queries may be directed to correction or clarification, e.g., "Did you mean . . . ?" alternatively or in addition, it is understood that some commands properly interpreted may lead to inquiries direct towards elaboration and/or further clarification. Consider a user request to insert an actor, e.g., a soldier, into a scene. The analyzer module 219 having determined an intention to insert the soldier may require further intention, e.g., as to whether the soldier would be generated by the content development tool(s) 213, i.e., a new soldier, or whether the soldier would be selected from a library resource of stored soldiers. Perhaps the inquiry may ask which library to use, and/or other features, such as library access costs, type of soldier, e.g., revolutionary war era, civil war era, etc.

The instruction generator 220 may be adapted to generate one or more instructions based on one or more intentions received from the analyzer module 219. The instruction generator 220 may be adapted to generate instruction(s) according to one or more particular content development tools 213. It is understood that many currently available content development tools 213 require a certain degree of familiarity and/or proficiency, e.g., as may be garnered by prior experience and/or training. It is also understood that such experience and/or training may serve as a barrier to entry for many users. In at least some embodiments, the instruction generator 220 may be preconfigured with associations of intentions with actionable instructions. Thus, when an intention and/or group of intentions is received from the analyzer module 219, the instruction generator 220 may identify actionable instructions according to the predetermined associations.

In at least some embodiments, the particular actionable instructions may depend on which content development tool 213 will be employed in fulfilling the intention. Consider the instruction generator 220 having a first group of predetermined associations of intentions and actionable commands according to a first development tool and a second group of predetermined associations of intentions and actionable commands according to a second development tool. To the extent the instruction generator 220 is aware of which development tool will be employed, it may choose the appropriate group of predetermined associations. Thus, the actionable commands will be configured and/or otherwise adapted for presentation to the appropriate tool 213, which may proceed to enact upon the actionable commands to develop digital content according to the determined intention.

The example natural language processor 210 includes a tool access module 221 in communication with the command module 211, e.g., via one or more of the instruction generator 220 and/or the analyzer module 219. In some embodiments, the tool access module 221 is adapted to identify a particular content development tool 213 in association with a particular intention and/or group of actionable commands generated responsive to the particular intention. The particular tool 213 may be a default tool determined according to system configuration, user preferences, prior tool association and/or access rights and/or credentials. User preferences may include a user choice identified by a user profile and/or obtained via the user interface 217, e.g., via natural language input and/or user selection from a presented list of accessible tools 213. User preferences may be limited by tool access license agreements, user access restrictions, subscription levels, and the like.

In at least some embodiments, the tool access module 221 facilitates identification of a particular content development tool 213. For example, the analyzer module 219 having determined one or more intentions responsive to the natural language input, may implement logic to identify a particular tool 213 according to one or more of the nature of the intention and/or user authorization and/or access rights. In some embodiments, the analyzer module 219 provides an indication of the selected tool 213 to the instruction generator 220 and/or the tool access module 221. The instruction generator 220 may apply an appropriate association based on the identified tool in order to obtain actionable commands suitable for the identified tool 213.

Alternatively or in addition, the analyzer module 219 may require user input to resolve any ambiguity in selection of the appropriate tool 213. For example, a determined intention may be carried out by more than one content development tool 213. It is conceivable that the analyzer module 219, the tool access module 221 and/or a combination thereof may implement rules and/or logic to select from among a list of multiple tools 213. The rules and/or logic may be adapted to make such selections according to one or more of cost, quality, latency, license restrictions, authorizations, prior experiences, and the like. In at least some embodiments, the analyzer module 219 and/or the tool access module 221 may initiate a prompt to a user via the user interface 217 requesting additional user input to facilitate tool identification. Such user prompts may include one or more of identifying available alternatives, identifying other factors, such as costs, tool sources, ratings, user reviews, and the like. Having identified a target content development tool 213, the tool access module 221 may be adapted to forward to the tool 213 the actionable commands received from the instruction generator 220.

The digital content development tools may include, without limitation, machine-readable instructions, e.g., computer software, for use in one or more of creating animation, rendering animation, executing animation, displaying animation, visual effects, video games, computer games, virtual reality, augmented reality, digital media content. The content development tools may include proprietary tools and/or commercially available tools. By way of illustrative example and without limitation, the tools may include graphic modeling tools, such as TurboSquid, a digital media company that sells stock 3D models used in 3D graphics; SpeedTree, a group of vegetation programming and modeling software products developed and sold by Interactive Data Visualization, Inc. Alternatively or in addition, the tools may include animation tools, such as Blender, an open-source 3D computer graphics software toolset used for creating animated films, visual effects, art, 3D printed models, motion graphics, interactive 3D applications, and computer games. Other example animation tools include 3D studio Max, a professional 3D computer graphics program for making 3D animations, models, games and images, developed and produced by Autodesk Media and Entertainment, and MAYA®, a registered trademark of Autodesk, Inc., Mountain View, Calif., for computer software for use in creating, rendering, executing and displaying animation, visual effects, video and computer games, and digital media content).

In at least some embodiments, the content development tools may include game engines, such as the Unreal Engine, a game engine developed by Epic Games, and/or the Unreal Development Kit, for creating and/or modifying computer games. More generally, at least some content development tools may be adapted primarily for game developers, while others may be adapted primarily for end users, e.g., consumer-oriented tools as may be employed by game players in association with game play. One example of a consumer-oriented tool is the "Dreams" user-generated content game available from Media Molecule, Guildford, U.K., which provides a consumer-oriented experience for creating games and other content including movies and music. Other non-limiting example classes of content creation tools may include tools that exist within games such as Fortnite and Minecraft. Access to tools and features within games, such as Fortnite and Minecraft, may be integrated with the techniques disclosed herein, e.g., as integrated via one or more of a plugin, an API, a software development kit (SDK) or other technique to provide users with capabilities to extend and modify a game experience and/or to modify and/or to add content to it.

Still other games may provide lower-level "modding" tools that may be integrated with and/or otherwise interfaced by the systems, devices, processes and techniques disclosed herein. Examples include the "Half Life" video game, developed by Valve and published by Sierra Studios and the "Quake" video game developed by id Software and published by GT Interactive, first-person shooter video games, and the "Fallout" video game developed and published by Interplay Productions. Such "modding" tools may be used extensively by a creator community to change or extend the original experiences provided by the games originating development studio. It is envisioned that one or more of the techniques disclose herein may be applied to such example games and/or tools to facilitate operation and/or access to such games and/or tools by developers and end-users alike.

Another example of a game engine tool is Unity, a cross-platform game engine developed by Unity Technologies. Such game engines may be used to create three-dimensional, two-dimensional, virtual reality, and augmented reality games, as well as simulations and other experiences. Game engines may include terrain engines for detailed 3D environments, lighting effects, such as real-time dynamic shadows, directional lights and spotlights, particle effects, video playback. For example, the system may interpret natural language commands and generate commands based on the interpretation according to an associated development tool, e.g., using Unreal Engine's native scripting language used for authoring game code and gameplay events, Unity's Scriptable Render Pipeline allowing developers to create high-end graphics, and/or the Wolfram Language, from Unity, for accessing high-level functions of the Wolfram language.

When combined with speech-to-text processing, the natural language processing may be used to process a human vocal utterance into a content creation command or content modification command. A content creation command may be sent to a downstream fulfillment service that can either retrieve an existing variant of the content in a library or to a service that uses procedural methods to generate the content. The retrieved or newly generated content may then be sent and/or otherwise applied to a content scene. A modification command may be sent and/or otherwise applied directly to the content scene. At any time, the user may export the content scene in a portable interactive or non-interactive format, application, or package in variants for different devices and platforms. At any time, the use may also choose to use a traditional input method such as mouse, keyboards, touch, or pen to apply modifications to the scene as method of fine grain adjustment.

In operation, the tool access module 221 receives the actionable command from the instruction generator 220. The intent determined from the natural langue user input is adapted according to a predetermined command structure of an identified development tool 213 or class of tools. The instruction generator 220 and/or tool access module 221 implement the actionable command to generate and/or modify a digital content item, resulting in a generated and/or modified digital content item according to the actionable command. In at least some embodiments, the generated and/or modified digital content item is provided to the content processor 215. The content processor 215 may perform one or more of an encoding, a decoding, and a rendering of the generated and/or modified content item to obtain a presentable form of the generated and/or modified digital content item. In at least some embodiments, the presentable form is provided to the display device 216 for presentation.

It is understood that in at least some embodiments, a presentation at the display device 216 may be observed by the user, e.g., to inspect the generated and/or modified digital content item that resulted from the original natural language input. The user, in turn, may accept the result by providing a confirmatory command or providing no corrective instruction by natural language input or otherwise. Should the user determine, however, that the result was unsatisfactory, e.g., observing that the user's intention was interpreted improperly, or that a consequence of a proper interpretation and implementation of the natural command did not meet the user's objectives, the user may provide a subsequent natural language instruction to initiate a corrective action. In at least some embodiments, the subsequent instruction may include a request to undo or otherwise unwind an instruction, such as the immediately previous instruction or group of instructions. In such instances, the system 200 may be adapted to simply undo the or unwind the identified instruction(s), e.g., deleting a newly generated content item, or undoing an associated modification to an existing digital content item. Alternatively or in addition, the system 200 may be adapted to further generate and/or modify the resulting modified content, as may be required.

The system and processes disclosed herein are adapted to facilitate rapid creation of 2D and/or 3D audio, visual, and/or audiovisual, interactive and non-interactive content consisting of, but limited to, characters, objects, and environments along with their behaviors, appearance, and other properties. Tools 213 and libraries 214 exist for assisting in rapidly creating 2D and 3D audio visual content. However, none are known which use voice as the primary interface. Speedtree is one popular tool for procedurally creating digital terrain. Turbosquid and Sketchfab are two popular 3D content libraries where 3D models can be purchased pre-made. Tools exist to automate music creation by specifying style, tempo, and other parameters. Various audio, music, and video libraries both online and offline provide a method of purchasing stock sound and video clips for projects. Text-to-speech systems (TTS) are widely available for creating synthetic voice sequences. Microsoft's "neural TTS" product is a recent available service for this purpose. Some service providers may offer commercially available libraries, e.g., mimicking and/or otherwise approximating natural voices, that could be used to create realistic text to speech sequences. As vendors, Microsoft, Google, Amazon, Nuance, and other companies offer natural language processing systems that customers can customize to predict intent or meaning from provided text sequences. Middleware authoring platforms such as Unity and Unreal provide methods of authoring content that can be exported to run as applications on a variety of device types. In at least some applications, one or more of the various the natural language processing techniques disclosed herein may be packaged as a plugin adapted to extend functionality of a digital development platform, such as Unity and Unreal.

Beneficially, the techniques disclosed herein may be applied to simplify processes of creating, developing, and/or otherwise manipulating 2D and 3D interactive and non-interactive content generation by reducing complexity, time required, and cognitive load. In at least some embodiments, voice inputs are received, interpreted, and/or adapted to minimize a cognitive load. Such systems and/or processes may be applied to increase an amount of digital content available for monetization, and/or to reduce one or more of content creation, content acquisition, and/or licensing costs.

Figure 2B:
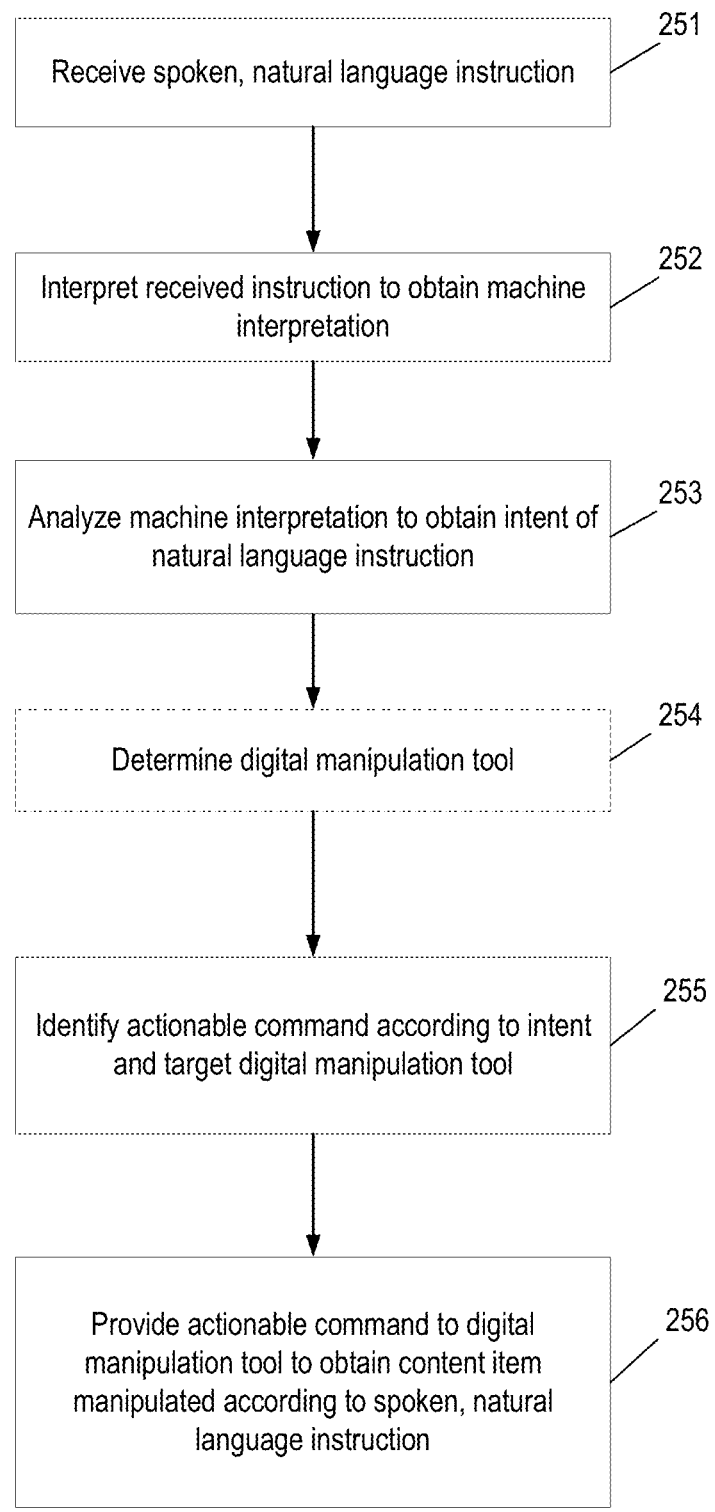
FIG. 2B depicts an illustrative embodiment of a digital content development process in accordance with various aspects described herein.

FIG. 2B depicts an illustrative embodiment of a digital content development process 250 in accordance with various aspects described herein. The process 250 includes receiving user input at 251. The user input may include natural language input, e.g., a word, phrase, sentence and/or sentences. It can be presumed in at least some instances that the natural language input relates to a command or instruction to further development of a digital content item, such as a scene, an object or item within a scene, an actor, animation, gameplay, and the like. The natural language input may be received according to one or more of an audio input, a visual input, e.g., by way of a still camera and/or a video camera system, a textual input, a user selection according to presented options, gestures, and the like.

The received instruction may be interpreted at 252 to obtain a machine interpretation. Interpretation may include speech-to-text processing for vocal instructions, e.g., translating spoken words to textual representations. Alternatively or in addition, interpretation may be based on characteristics of an audio signal obtained from a vocal instruction. Characteristics may include, without restriction, one or more of an amplitude response or a frequency response. For example, the interpreter module 218 may compare or otherwise correlate one or more of the amplitude or frequency responses to a library of responses associated with machine interpretations of such responses, without necessarily requiring a speech-to-text transformation.

The machine interpretation may be analyzed at 253 to obtain an intent of natural language instruction. For example, a machine-readable response, such as a textual response obtained from an interpretation of the input can be evaluated to determine an intention and/or intentions of the input. Evaluation may include, without limitation, a parsing of the input, an application of a grammar, and/or identification of key aspects of the input, such as an object to be acted upon, an action to be undertaken in relation to the object, and the like.

In at least some embodiments, the process 250 optionally determines a digital content development tool at 254, shown in phantom. It is envisioned that the process 250 may be employed in association with a single digital content development tool, e.g., packaged as a front end, or an add-on feature of the tool. Alternatively or in addition, the process 250 may be employed in association with multiple tools, e.g., as an independent application or app adapted to interact with multiple different content development tools. According to the latter scenario, the process 250 is adapted to identify which tool or tools of a number of available or possible tools should be associated with the user input. It is understood that a user may engage in a development session in which all or at least a group of user inputs will be directed to the same tool. Thus, a determination of an appropriate tool may be made once at 254 and applied to multiple inputs. Alternatively or in addition, a determination of an appropriate tool may depend on the particular user input. In such instances, a determination may be made at 254 for each user input and applied to the appropriate tool as determined.

An actionable command is identified at 255 according to the intent and a target digital development tool. As disclosed herein, one ore more actionable commands are determined responsive to the user input. The actionable commands may be structured and/or otherwise scripted according to an intention determined form the user input. It is understood that in at least some instances a set of possible commands may be bounded at least to some degree based upon the application to digital content development. Further restrictions to a set of possible commands may be bounded further based on a nature of a development project and/or the particular development tasks being implemented. For example, if it is understood that the project and/or user inputs will relate to animation, but not interactive content, then it can be inferred by the process 250 that the user input is related to animation and not to interactive content. In at least some embodiments, one or more actionable commands and/or scripts of such commands can be predetermined and associated with a list of possible intentions. In such instances, the process 250 having identified the intention at 252 may refer to the predetermined association to obtain the actionable commands at 255. The actionable command is provided at 256 to the digital development tool to obtain a digital content item created and/or otherwise manipulated according to the spoken natural language instruction obtained at 251.

Figure 2C:
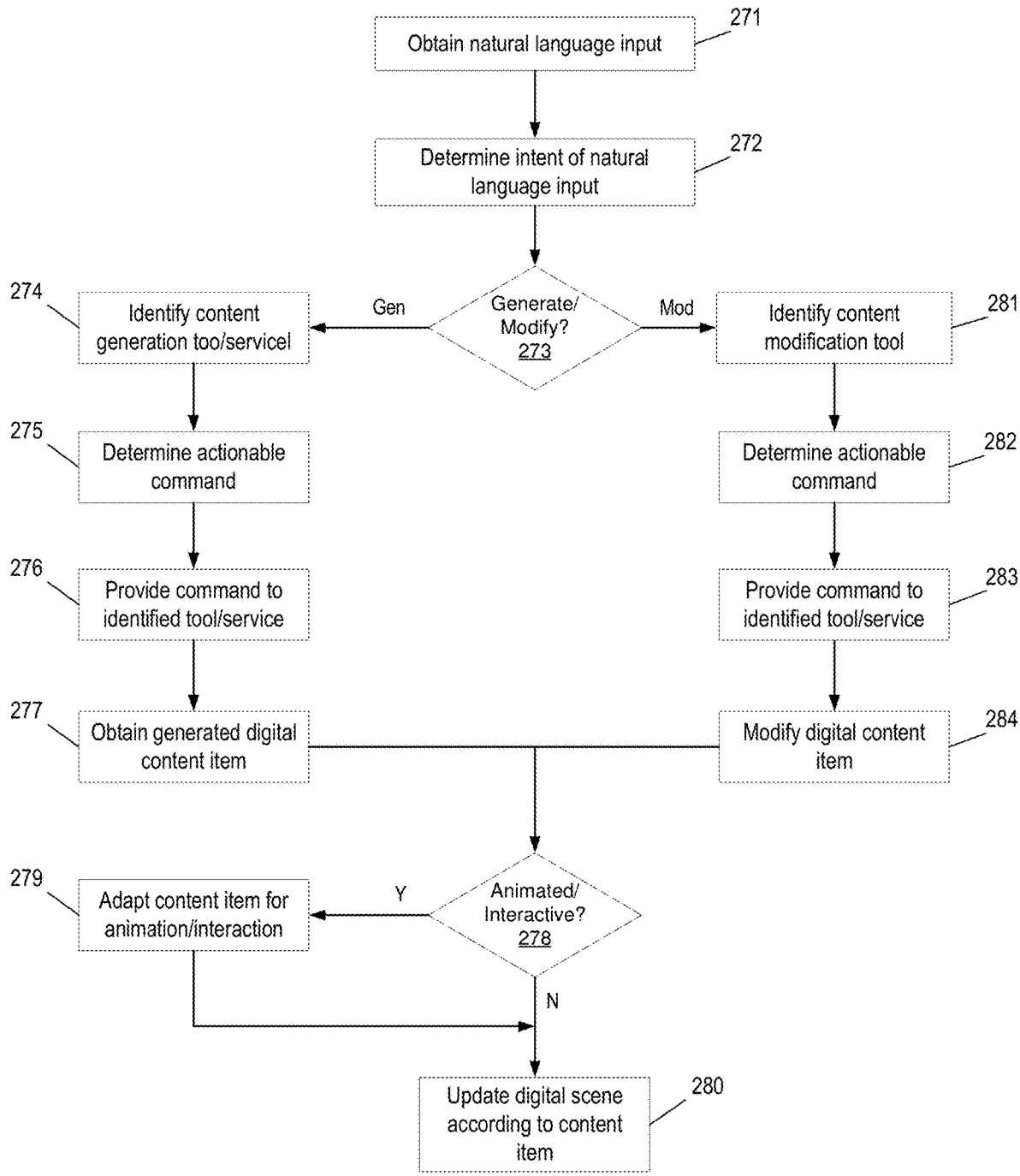
FIG. 2C depicts an illustrative embodiment of another digital content development process in accordance with various aspects described herein.

It is envisioned that in at least some embodiments, the process 250 may include interactive features, such as prompts to a user requesting clarification of an instruction received at 251 and/or confirmation that an interpretation obtained at 252 is correct. For example, a determined intention may be presented to a user via user interface in a format of a prompt for clarification and/or confirmation. Likewise, one or more results of FIG. 2C depicts an illustrative embodiment of another digital content development process 270 in accordance with various aspects described herein. The process 270 includes obtaining user input at 271. The user input may be obtained according to a natural language format according to any of the various input modes and techniques disclosed herein. An intention of the natural language input may be determined at 272. Determination of the intention may be obtained by one or more of any of the various intention determining techniques disclosed herein. A determination is made at 273, as to whether the intention relates to generation of a new digital content item or modification of an existing digital content item. References to new and existing may be in reference to a scene and/or project upon which a user is developing. For example, a preexisting digital content item may be requested or otherwise obtained from an external source, such as a digital development tool and/or a digital content library. Thus, the media content item may be existing in reference to the external source. However, an initial incorporation of the newly obtained digital content item into the scene and/or project may be considered as a generation of the digital content item.

To the extent it is determined at 273 that the intention relates to generation of a new digital content item, a digital content generation tool, service and/or source is identified at 274. Identification of the digital content generation tool and/or service may include any of the various techniques disclosed herein. One or more actionable commands are identified at 274 according to one or more of any of the various techniques disclosed herein. The one or more actionable commands are provided at 275 to the identified tool, service and/or source, and a generated digital content item is obtained at 277.

To the extent it is determined at 273 that the intention relates to modification of an existing digital content item, a digital content modification tool, service and/or source is identified at 281. Identification of the digital content modification tool and/or service may include any of the various techniques disclosed herein. One or more actionable commands are identified at 282, e.g., according to one or more of any of the various techniques disclosed herein. The one or more actionable commands are provided at 283 to the identified tool, service and/or source, and a modified digital content item is obtained at 284.

Having obtained a generated digital content item at 277 and/or a modified digital content item at 284, the process 270 progresses to determine at 278 whether the generated and/or modified digital content item is animated and/or interactive. In at least some embodiments, a determination whether the digital content is animated and/or interactive may be made according to the particular content development tool employed. Alternatively or in addition, such a determination may be made according to one or more of the user input, the determined intent, and/or the actionable commands. It is envisioned that such a determination may be facilitated by a user identity and/or a user profile and/or by a response to a direct user inquiry requesting whether animation and/or interactivity should be applied.

To the extent it is determined at 278 that the content item is animated and/or interactive, the content item is adapted at 279 for animation and/or interaction and the digital scene is updated at 280 according to the animated and/or interactive content item. To the extent it is determined at 278 that the content item is neither animated nor interactive, the digital scene is updated at 280 according to the generated and/or modified digital content item.

While for purposes of simplicity of explanation, the respective processes are shown and described as a series of blocks in FIGS. 2B and 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part obtaining a natural language instruction and interpreting it to obtain a machine interpretation that is analyzed to obtain an intention of the natural language instruction. An actionable command is determined according to the intention. The actionable command is adapted to cause a digital manipulation tool to digitally manipulate a content item to obtain a manipulated content item according to the natural language instruction.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

In some embodiments, such as the example system 300, a digital content development application 382 is in communication with one or more mobile devices 384a, 384b, . . . 384n, generally 284 and/or one or more static devices, 386a . . . 386m, generally 386. The digital content development application 382 can be adapted to facilitate in whole or in part interpretation of a natural language input to determine an intention regarding development of digital content according to the various techniques disclosed herein. Likewise, in at least some embodiments, such as the example system 300, a natural language processing service 380 is in communication with one or more of the mobile devices 384 and/or static devices, e.g., 386, and/or other components of the communication network virtualized network function, e.g., one or more of the virtual network elements 330, 332, 334. The digital content development application 382 can be adapted to facilitate in whole or in part development of digital content according to the actionable commands.

In at least some embodiments, one or more of the wireless access network systems 120 and/or the broadband access systems 110 include functionality, e.g., in the form of any one of an operating system, a client, a resident app, and combinations thereof. The resident functionality can be adapted to perform one or more of the techniques disclosed herein, such as interpretation of the natural language input to determine intention, generation of an actionable command to develop digital content according to the intention, and/or development of digital content according to the actionable commands.

The systems, processes and techniques disclosed herein make it easier for non-experts to create digital content, including animated and/or interactive content as may be employed in a computer game, or as special effects in a television show or movie. For example, a user may enter voice commands, by simply say what they want to do, e.g. "Create a space warship scene with 5 ships coming in from the right over a green planet . . . ." It is understood that one or more of the disclosed functionality may be implemented with the assistance of one or more of a mobile device, e.g., as an app, and/or a desktop computer or workstation. The functionality may be provided to user devices as a resident program, as a client portion of a client-server architecture, as a portal to a service, e.g., as a Web app, and so on.

By way of further example, a user describes a digital content development instruction or command. The user input can be obtained according to a natural language format. Beneficially, according to the techniques disclosed herein, the natural language input is programmatically synthesized into actionable commands suitable for a target digital content development tool. Thus a command such as "make 1000 ships appear" may be synthesized into commands that select and/or generate a ship, copy the ship 1000 times and place, or otherwise arrange the ships within a digital development environment.

Accept user speech and turn into actions (this part is not new), e.g., can use ALEXA services, MS services, Google Speech, IBM Watson, etc. Any natural language understanding system can be used. Still other systems use other methodologies for doing the same without necessarily converting waveforms to text—they just act more directly on the waveform. Microphone/voice may not be necessary for input modes that are text based, gesture based (e.g., Xbox), mouse point & click, etc., anything suitable to accept user input to a computer. Anything outside of natural language-based input, e.g., gestures, may be used as a modifier, e.g., use gesture, such as touch to change size.

Other user inputs, such as "generate terrain," "forested fill space" may describes how to create a land portion of a scene. Responsive to an interpretation of such natural language commands, selection of a digital content development tool and/or structuring of related actionable commands may be adapted to use a database of pre-created 3D texture assets, e.g., using TextFab and/or TurboSquid, which provide libraries of such things. The actionable instructions may include "go and grab 'terrain' from database X." Alternatively, the actionable instructions may be adapted to generate terrain on the fly according to algorithmically generates terrain, e.g., SpeedTree. In more detail, the determined intent may include an action: "generate" using algorithm Y, e.g., SpeedTree or search database X to identify Z. Searchable records may include commercial libraries that provide an API, or internal proprietary libraries.

In some instances, determined intent may include an action: "Modify"+"change scale" to make a 3D object bigger/smaller, e.g., multiply by a scalar. Other "modification" type actions may include, without limitation, rotate, move, duplicate, delete ("get rid of that"=delete). Different types of command types—based on command type, command is sent to the appropriate fulfillment service, e.g., an identified on of a number of digital content development tools.

In some instances, determined intent may include an action: content generate command type. Content generation actions may be more sophisticated than content modification commands, which may require little more than querying a library. Still other determined intentions may include a procedural animation, e.g., a natural language input requesting that a soldier walk from left to right.

Once a "scene" is created/assembled, the scene and/or elements of the scene can be further modified and/or otherwise adapted for general consumption. For game applications, the user may want to share a developed scene as an interactive content format package or application (middleware packages, such as Unity & Unreal—create a common theme. For example, development and/or preparation of a scene may include application of one or more of gameplay dynamics, support for virtual reality, controllers, then can export to one or more different platforms: make this a mobile phone app, make this a computer app, make this an AR app., possibly making modifications before ultimately export for use by the different platforms.

By way of an example of passive content a user creates a scene and want to see a spaceship blowing up a planet. Actionable commands may identify the scene, the spaceship, and/or the planet. The interpreted action may be to cause the spaceship to emit a ray, a beam or the like and to have planet to explode in reaction to the ray or beam. The explosion event may be adapted to occur over a time period identified int the actionable commands, e.g. 30 seconds, and the results exported or otherwise provided for presentation and display as an MP4 file. In the illustrative example, particulars of the explosion, timeframes and the like may be inferred from one or more of the scene, prior applications of similar instructions, user preferences, e.g., according to a user profile, and/or in response to a direct query: "Please identify duration of explosion in seconds," to which the user enters a subsequent entry: "30 seconds." Such queries may include a recommendation or guess that may be implemented as a default should a user fail to correct or clarify.

It is envisioned that resulting generated content, e.g., the example MP4 file may be shared with friends, posted on Instagram, rendered as an image, not a video. Audio may or may not be inclusive as the case may be, along with other effects, e.g., vibrating device responsive to game actions, etc.

It is envisioned that the techniques disclosed herein may be employed by users experienced in detailed operation of the digital content development tools. Such experienced users may utilize the natural language input to obtain a "rough scene" to "block" something out, as a storyboarding tool. If gets some traction, then may stop using voice and revert to the expertise. Alternatively or in addition, the techniques disclosed herein may be used to obtain a relatively rough results that may be adjusted according to finer grained controls, or tweaking, using the techniques disclosed here and or in cooperation with manual input of experienced users.

In the following illustrative example a natural language user input is parsed and/or otherwise interpreted into an action list. Particular actions may be identified and/or categorized. Actions may then be associated with content development and/or modification resources, which are manipulated according to actionable commands automatically obtained from the natural language user input. The content development and/or modification resources respond to the actionable commands to generate and/or modify content based on user input.

For example, a user input to generate terrain may be interpreted and/or otherwise processed to obtain:
  Action: Generate
  Type: Terrain
  Sub-type: . . . .

Other examples of intent may include "generate maps," "library retrieval," "modify content item," and/or "delete content item. User input may be interpreted to narrow possible intentions according to certain domains, e.g., terrains, characters. The processes may use existing tools, e.g., open source tools, or simply define a particular grouping of words means "generate." A particular tool may require a strict sequence of words that mean generate that may be interpreted, e.g., using machine learning to create a myriad of different ways that a user input may reduce down to an actionable intent, such as "generate." It is envisioned that in at least some embodiments, one or more aspects of the functionality disclosed herein may be implemented in a cooperation with an existing natural language processing tool, such as Alexa.

Figure 4:
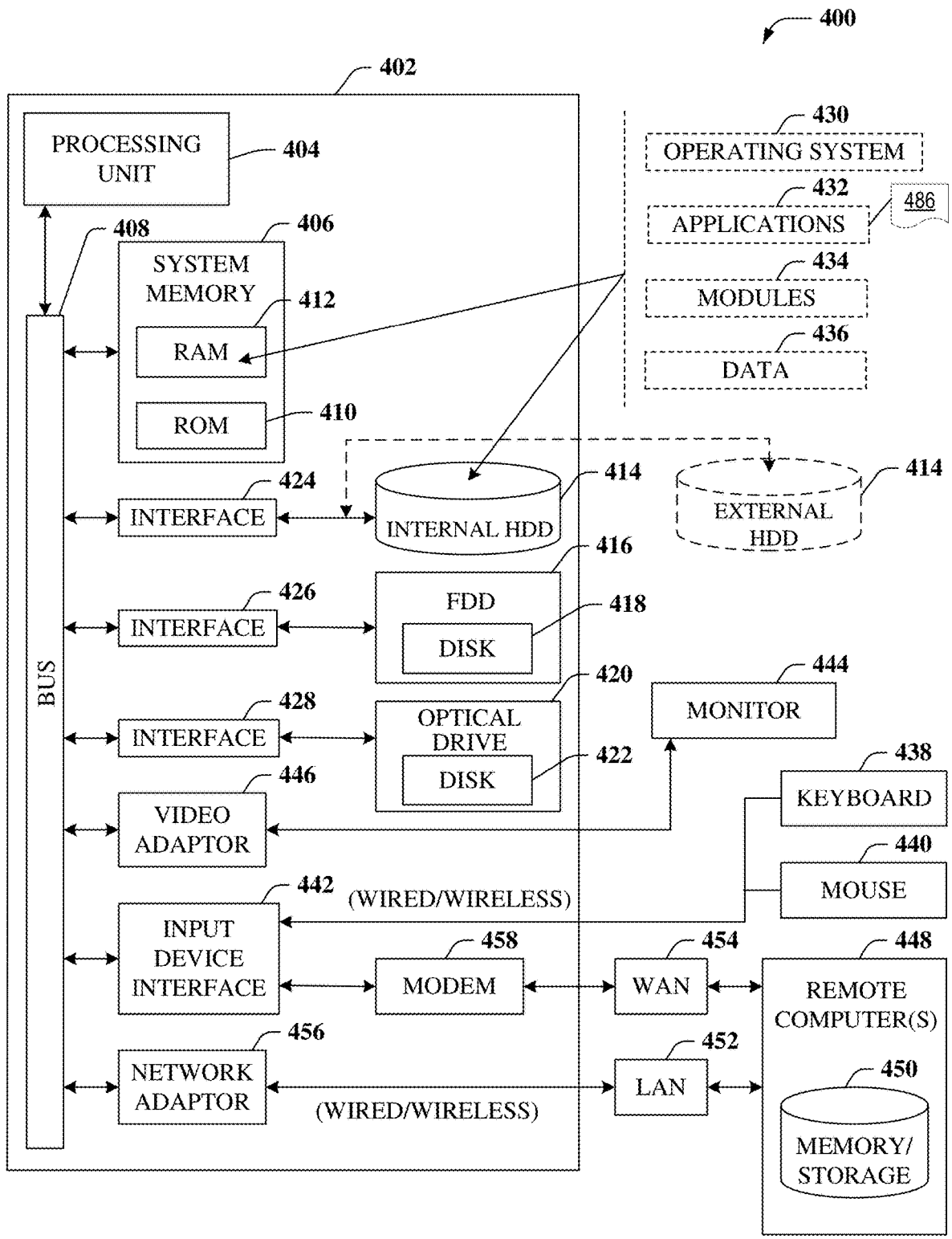
FIG. 4 is a block diagram of an example, non-limiting embodiment of a computing environment in accordance with various aspects described herein.

Turning next to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining a natural language instruction and interpreting it to obtain a machine interpretation that is analyzed to obtain an intention of the natural language instruction. An actionable command is determined according to the intention. The actionable command is adapted to cause a digital manipulation tool to digitally manipulate a content item to obtain a manipulated content item according to the natural language instruction.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

When used in a natural language-based, digital content development application, the computer 402 can include one or more applications 432 that may be adapted to include functionality 486 directed to one or more of interpretation of a natural language input to determine an intention of a provider of the natural language input, generation of an actionable command to develop digital content according to the intention, and/or development of digital content according to the actionable commands and according to the various techniques disclosed herein.

Figure 5:
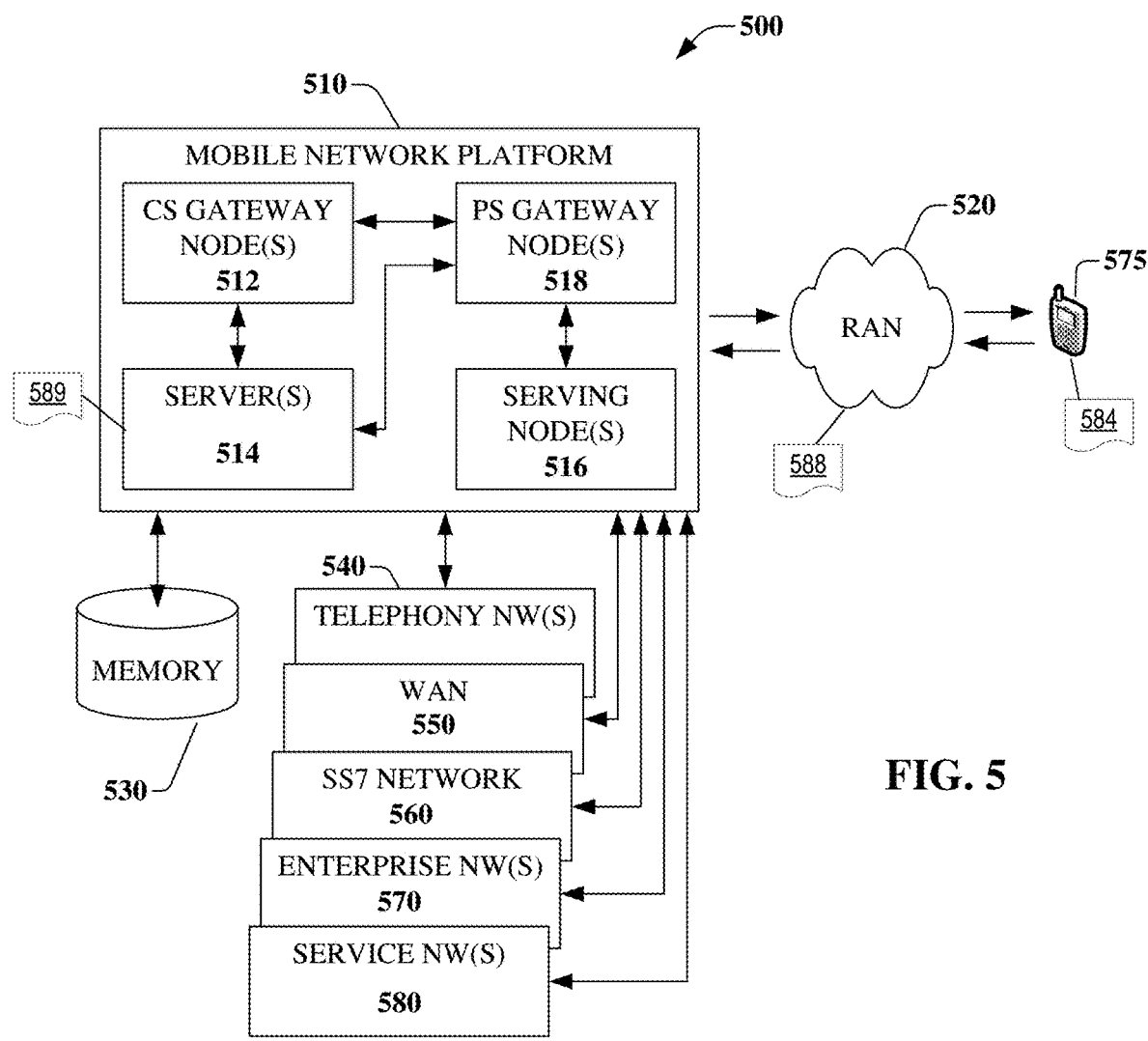
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining a natural language instruction and interpreting it to obtain a machine interpretation that is analyzed to obtain an intention of the natural language instruction. An actionable command is determined according to the intention. The actionable command is adapted to cause a digital manipulation tool to digitally manipulate a content item to obtain a manipulated content item according to the natural language instruction. In one or more embodiments, the mobile network platform 510 can generate and receive signals transmitted and received by base stations or access points such as base station or access point 122.

Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

When used in a natural language-based, digital content development application, the embodiment 500 of the mobile network platform 510 may include one or more of functionality 589 at the server(s) 514, functionality 588 operational within the RAN 520 and/or functionality 584 operational within the mobile device 575. One or more of the disclosed functionalities 584, 588, 589 can be adapted to process natural language input to determine intent and/or to generate one or more actionable commands to develop digital content according to the intent. Alternatively or in addition, one or more of the disclosed functionalities 584, 588, 589 can be adapted to develop digital content, including one or more of digital content generation and manipulation or modification, according to the various techniques disclosed herein.

Figure 6:
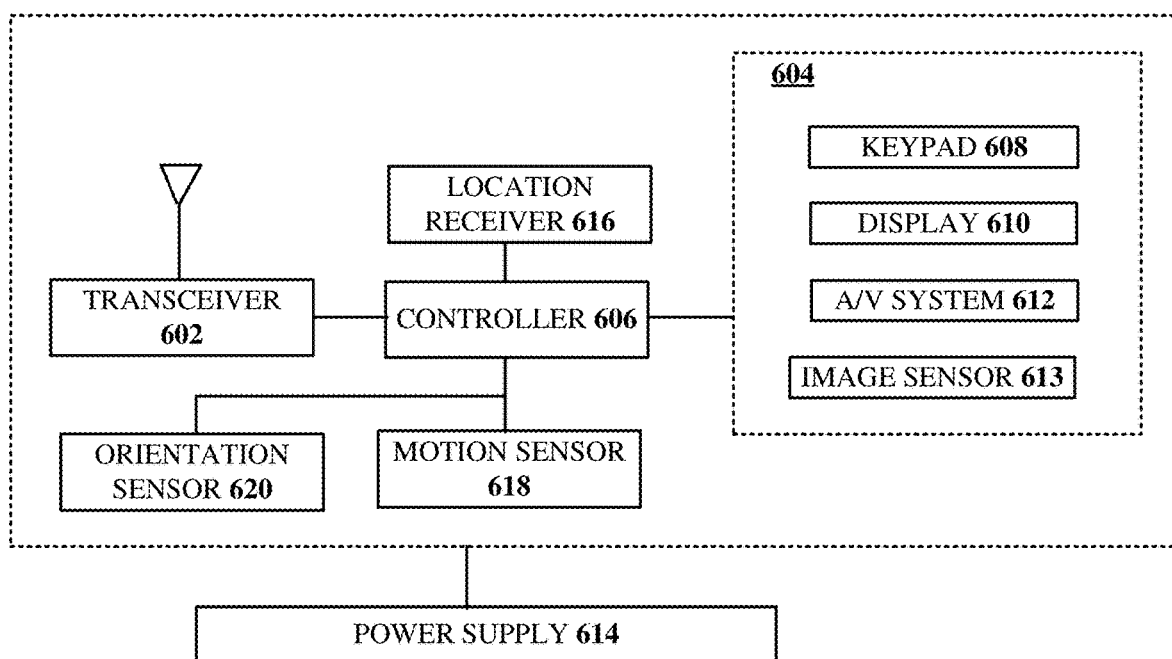
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining a natural language instruction and interpreting it to obtain a machine interpretation that is analyzed to obtain an intention of the natural language instruction. An actionable command is determined according to the intention. The actionable command is adapted to cause a digital manipulation tool to digitally manipulate a content item to obtain a manipulated content item according to the natural language instruction.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive, or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The digital content development techniques disclosed herein can be applied to a wide variety of applications and/or digital content types and mediums including but not limited to games, movies, television, internet video, internet content, virtual reality, augmented reality, mixed reality, and advertising content. For example, the tool may be utilized as part of an interactive advertisement in which natural language input from a consumer is obtained and used to generate and/or modify digital content of an advertisement. The interactive advertisement may be placed in an ad space, e.g., in an Over-The-Top Video stream of a movie. In such an application, the "interactive" aspect may allow for adjustment of the advertisement, such as a scene, an object and/or character within the scene in near-real-time.

As an example, a voice instruction for a car commercial may cause changes to a make or model of a car and/or a characteristic of the vehicle, such as its color that may be shown in interactive advertisement. The natural language input may be obtained in resonse to system prompts, e.g., questions, to which a user may respond. Alternatively or in addition, the natural language input may be obtained through consumer dialogue and/or commentary as may be captured during a particular viewing session and/or over an extended period of time that may include many different viewing sessions. In some embodiments, natural language may be obtained by other systems, such as personal, home, or vehicle digital assistances adapted to capture spoken input. Such natural language input may be analyzed by the system, e.g., to determine preferences, interests, likes and/or dislikes that may be used by the system in developing digital content in a general sense, e.g., to be used by the system in any guesses that may be employed. In other instances, the system may use any natural language captured by the system and/or by other systems, to anticipate future instructions related to development of digital content. Such anticipatory action may include generation of scenes, characters, objects, association of brands, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In at least some embodiments, the disclosed subject matter may be utilized as an interface in a broad range of device platforms including, without limitation, desktop computers, mobile devices of all kinds including smartphones, tablets, wearables, augmented reality (AR) headsets, and virtual reality (VR) headsets. It is understood that the disclosed subject matter may utilize a microphone or other device capable of capturing vocal utterances as may be available within such device platforms and/or added thereto. Output signals from such vocal capturing devices may be sent to a natural language processing system that may be resident on the device and/or running remotely, e.g., over a network as a server resource. A networked server resource may include any type of network, e.g., locally, centralized, and/or at a network edge.

In at least some embodiments, the disclosed subject matter may utilize a virtual assistant, or so-called, smart speaker, such as the Alexa® voice-controlled information device, a trademark of Amazon Technologies, Inc., Seattle, Wash., and/or smart speaker and/or screens, such as Nest® audio input devices, a trademark of Google, Inc., Mountain View, Calif. In at least some embodiments, the audio input device may not be natively integrated into a device, such as a device platform operating according to the disclosed subject matter. For example, the audio input may include microphone that may be pluggable into and/or otherwise connectable to such a platform.

In at least some embodiments, input may include audio input, e.g., vocalization and/or non-vocal utterances. It is understood that, without limitation, such audio input may include recorded human voice sequences that may be used, e.g., to generate textual input. These could be recorded by the user or they could come from other sources. Alternatively or in addition, audio input may include synthesized audio. For instances where audio input is used for a natural language processing system, any vocal utterance audio may be synthesized by a computational process. For example, AI and/or a computational driven entity, e.g., controlled by rules, scripts or other method, may generate a vocal utterance. By way of example and without limitation, AI and/or computational driven entities may include one or more of software agents, avatars, non-player characters, and/or bots of all types.

In at least some embodiments, devices, systems, processes and the like, operating according to the disclosed subject matter, may operate exclusively according to a non-vocal, e.g., a text input-based interface. Example text-based interfaces may include, without limitation, command line interfaces, graphic user interfaces (GUI's) and/or text based communications applications and services such as SMS and messaging applications, such as WhatsApp® instant messaging software, a trademark of WhatsApp Inc., Menlo Park, Calif., Facebook Messenger, and so on.

It is envisioned that in at least some embodiments, a source of input, e.g., text does not need to be human generated. For example, textual input may be generated and/or synthesized by a computational process. For example, a user wants to create a visual scene similar to or as seen in a photo or a video sequence. The user may send the photo and/or video sequence to an application and/or service, e.g., that runs AI-based analysis of the photo and/or video sequence. The analysis may generate a descriptive text string that may be processed according to the disclosed subject matter into content creation instructions. In at least some embodiments, the text generated by the AI analysis is human readable. Alternatively or in addition, text generated by the AI analysis is not entirely human readable. In at least some embodiments, the input does not necessarily need to be text, e.g., including machine readable code of any type. Such machine-readable code and/or commands may be provided as direct API and/or system calls to a content creation system. A source of the input, e.g., text, may be from a movie script, a book, or other document. The textual and/or non-textual system input may also be generated by an AI or computational driven entity, e.g., controlled by rules, scripts and/or other suitable method. Examples of such entities includes, without limitation, one or more of agents, avatars, non-player characters, and bots of all types.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

It is understood that the disclosed subject matter may function with any type of software application and/or service, including applications and/or services running on any of the example devices and/or systems disclosed herein, inclusive of mobile device apps, desktop applications, and the like, whether downloaded and/or obtained via physical media and/or other type of storage. It is envisioned that in at least some embodiments, devices, systems, processes and the like, operating according to the disclosed subject matter, may run within and/or interface with a cloud-based application. In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining, and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches, and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   receiving, by a processing system including a processor, a natural language instruction;
   generating, by the processing system, a machine-readable input based on the natural language instruction;
   interpreting, by the processing system, the machine-readable input to obtain a machine interpretation of the natural language instruction;
   analyzing, by the processing system, the machine interpretation of the natural language instruction to obtain an analyzed intent of the natural language instruction;
   identifying, by the processing system, a first actionable command comprising a scripted command of a native scripting language of a first digital manipulation tool adapted to cause the first digital manipulation tool to digitally manipulate a content item according to the analyzed intent of the natural language instruction, to obtain a manipulated content item; and
   providing, by the processing system, the first actionable command to the first digital manipulation tool to obtain the manipulated content item.

2. The method of claim 1, wherein the natural language instruction comprises an instruction spoken by a human, and wherein the generating the machine-readable input further comprises converting, by the processing system, the natural language instruction to a textual representation of the natural language instruction.

3. The method of claim 1, wherein the natural language instruction comprises an instruction spoken by a human, and wherein the generating the machine-readable input is accomplished without obtaining a speech-to-text translation of the instruction spoken by the human.

4. The method of claim 1, wherein the analyzing of the machine interpretation of the natural language instruction further comprises using a natural language processor to obtain a functional understanding of the machine interpretation, wherein the analyzed intent is obtained according to the functional understanding.

5. The method of claim 1, further comprising identifying, by the processing system, the first digital manipulation tool according to the machine interpretation of the natural language instruction.

6. The method of claim 1, wherein the first actionable command comprises a creation command, the manipulated content item comprising a newly created content element responsive to the natural language instruction.

7. The method of claim 1, wherein the first actionable command comprises a modification command, the manipulated content item comprising a modified content element responsive to the natural language instruction.

8. The method of claim 1, the first actionable command comprises an animation command, the manipulated content item comprising an animated content element responsive to the natural language instruction.

9. The method of claim 1, wherein the receiving the natural language instruction further comprises:
receiving, by the processing system, an audio signal comprising the natural language instruction.

10. The method of claim 9, wherein the audio signal comprises one of a baseband audio signal, a radio frequency wireless signal, or a combination thereof.

11. A device, comprising:
a processing system including a processor; and
a memory that stores executable instructions that, when executed by the processing system, facilitate performance of operations, the operations comprising:
obtaining an input signal comprising a natural language instruction;
interpreting the input signal to obtain a machine interpretation of the natural language instruction;
analyzing the machine interpretation of the natural language instruction to obtain an intent of the natural language instruction;
determining an actionable command comprising a scripted command of a native scripting language of a first digital manipulation tool adapted to cause a digital manipulation tool to digitally manipulate a content item according to the intent of the natural language instruction, to obtain a manipulated content item; and
sending the actionable command to the digital manipulation tool to obtain the manipulated content item.

12. The device of claim 11, wherein the interpreting the input signal further comprises converting the input signal to a textual representation of the natural language instruction.

13. The device of claim 11, wherein the interpreting the input signal is accomplished without obtaining a speech-to-text translation of the input signal.

14. The device of claim 11, wherein the analyzing of the machine interpretation of the natural language instruction further comprises using a natural language processor to obtain a functional understanding of the machine interpretation, wherein the intent is obtained according to the functional understanding.

15. The device of claim 11, wherein the determining the actionable command is according to predetermined operational requirements of the digital manipulation tool.

16. The device of claim 11, wherein the actionable command comprises a creation command, the manipulated content item comprising a newly created content element selected from a group consisting of a scenic element of a digitally represented environment, an object element adapted for presentation within the digitally represented environment, an actor element adapted for animation within the digitally represented environment, and any combination thereof.

17. A non-transitory, machine-readable medium, comprising executable instructions that, when executed by a processing system including a processor, facilitate performance of operations, the operations comprising:
obtaining a natural language instruction;
interpreting the natural language instruction to obtain a machine interpretation of the natural language instruction;
analyzing the machine interpretation of the natural language instruction to obtain an intent of the natural language instruction;
determining an actionable command comprising a scripted command of a native scripting language of a first digital manipulation tool adapted to cause a digital manipulation tool to digitally manipulate a content item according to the intent of the natural language instruction, to obtain a manipulated content item; and
providing the actionable command to the digital manipulation tool to obtain the manipulated content item.

18. The non-transitory, machine-readable medium of claim 17, wherein the interpreting the natural language instruction further comprises obtaining a textual representation of the natural language instruction.

19. The non-transitory, machine-readable medium of claim 17, wherein the interpreting the natural language instruction is accomplished without obtaining a speech-to-text translation of the natural language instruction.

20. The non-transitory, machine-readable medium of claim 17, wherein the analyzing of the machine interpretation of the natural language instruction further comprises using a natural language processor to obtain a functional understanding of the machine interpretation, wherein the intent is obtained according to the functional understanding.

* * * * *